(12) United States Patent
D'Alo et al.

(10) Patent No.: US 8,301,940 B2
(45) Date of Patent: *Oct. 30, 2012

(54) METHOD FOR MONITORING DATA PROCESSING SYSTEM AVAILABILITY

(75) Inventors: Salvatore D'Alo, Rome (IT); Arcangelo Di Balsamo, Aprilia (IT); Alessandro Donatelli, Rome (IT)

(73) Assignee: International Business Machines Corporation, Armonk, NY (US)

( * ) Notice: Subject to any disclaimer, the term of this patent is extended or adjusted under 35 U.S.C. 154(b) by 992 days.

This patent is subject to a terminal disclaimer.

(21) Appl. No.: 12/328,521

(22) Filed: Dec. 4, 2008

(65) Prior Publication Data

US 2009/0204854 A1   Aug. 13, 2009

Related U.S. Application Data

(63) Continuation of application No. 11/230,339, filed on Sep. 20, 2005, now Pat. No. 7,536,632.

(30) Foreign Application Priority Data

Jan. 10, 2004 (EP) .................................. 04104830

(51) Int. Cl.
*G06F 11/00* (2006.01)
(52) U.S. Cl. ........................... 714/47.2; 714/55

(58) Field of Classification Search ............... 714/38.12, 714/47.1, 47.2, 55, 814, 815
See application file for complete search history.

(56) References Cited

U.S. PATENT DOCUMENTS

| | | | | |
|---|---|---|---|---|
| 5,917,731 A * | 6/1999 | Ferenczi et al. | ................ | 703/17 |
| 6,587,811 B2 * | 7/2003 | Schleifer et al. | ................ | 702/176 |
| 7,222,268 B2 * | 5/2007 | Zaifman et al. | ................ | 714/47.2 |
| 7,536,632 B2 * | 5/2009 | D'Alo et al. | ................ | 714/814 |
| 7,774,644 B2 * | 8/2010 | Fairhurst et al. | ................ | 714/6.13 |
| 8,023,421 B2 * | 9/2011 | Lloyd et al. | ................ | 370/252 |
| 2011/0016362 A1 * | 1/2011 | Holzaepfel et al. | ................ | 714/51 |

* cited by examiner

*Primary Examiner* — Marc Duncan
(74) *Attorney, Agent, or Firm* — Garg Law Firm, PLLC; Rakesh Garg; Jeffrey S. LaBaw

(57) ABSTRACT

A method, system, and product for monitoring the availability of a data processing system are proposed. The system runs a management application involving the periodic transmission of blocks of data from multiple local computers to a central computer. Whenever a block of data must be transmitted by a generic local computer, an expected transmission delay of a next block of data (with respect to the current one) is estimated and attached to the block of data. The central computer receiving the updated block of data can calculate an expected receiving time of the next block of data accordingly. If the next block of data is not received in due time, the central computer determines a failure of the local computer. The central computer also scans a subset of ports of the local computer, to ascertain whether the problem is due to a temporary unavailability of the application.

9 Claims, 5 Drawing Sheets

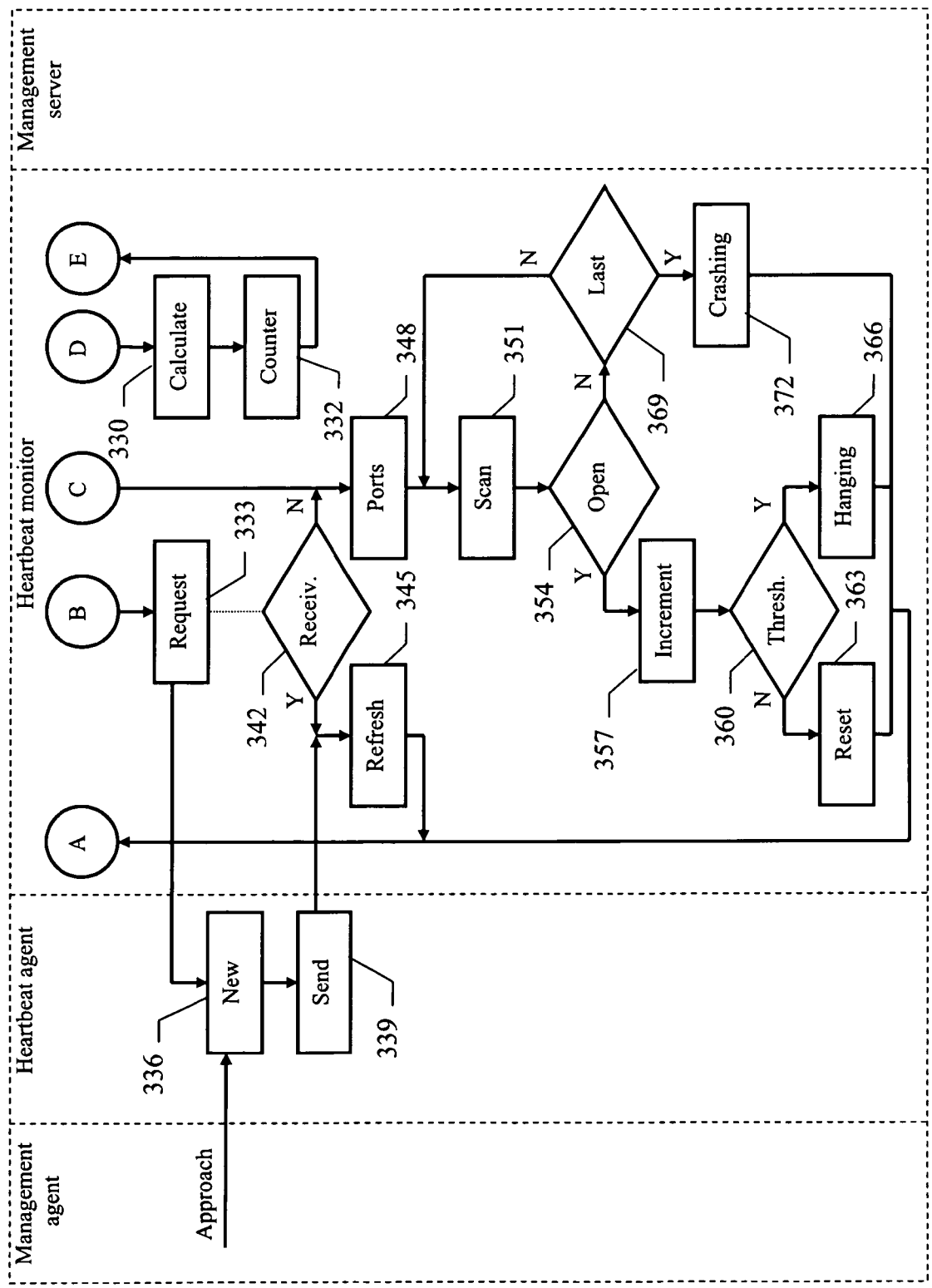

METHOD FOR MONITORING DATA PROCESSING SYSTEM AVAILABILITY

The present application is a CONTINUATION APPLICATION of application Ser. No. 11/230,339 filed on Sep. 20, 2005.

TECHNICAL FIELD

The present invention relates to the data processing field. More specifically, the present invention relates to a method for monitoring availability of a data processing system. The invention further relates to a computer program for performing the method, and to a product embodying the program. Moreover, the invention also relates to a corresponding data processing system.

BACKGROUND ART

Monitoring the availability of a data processing system (and especially a large network of computers) is a key issue in several applications. This activity allows detecting any unit of the system that is not working properly, so that suitable actions can be taken in an attempt to remedy the situation. For example, it is possible to replace a crashed unit with a corresponding backup unit (previously in a standby mode), or to distribute the workload of the system across the other units (working properly). As a result, a high degree of fault-tolerance can be achieved, thereby avoiding any interruption in a service offered by the system; this is of the utmost importance in systems that implement critical applications (for example, financial transactions, air traffic control, and the like).

A commonplace solution for monitoring the availability of the system is that of having each unit transmit a heartbeat signal at regular intervals to a central monitor. The heartbeat signal indicates that the unit is alive; therefore, if the central monitor does not receive the heartbeat signal as expected, it assumes a crash of the unit. Different policies can be adopted to make the detection of the crash more flexible; for example, this happens when a predefined number of heartbeat signals have not been received in a significant time frame.

A drawback of the above-described technique is that it involves an overload of the system. For example, this reduces the bandwidth of a network that is also used for the actual flow of data. As a result, the performance of the applications running on the system is adversely affected.

A possible solution is that of reducing the transmission rate of the heartbeat signals. However, in this case the delay between any crash and its detection is accordingly increased (being equal to the heartbeat signal period in the worst situation). The resulting degradation in the availability of the system is unacceptable in several situations (for example, when the system implements critical applications).

A different solution is disclosed in U.S. Pat. No. 6,370,656. This document proposes varying the heartbeat rate of each unit adaptively. For example, the heartbeat rate is updated according to the age of the unit, its temperature, or the number of errors occurred in the past. In this way, it is possible to have a low heartbeat rate for units that are unlikely to experience any problem; at the same time, the heartbeat rate increases as the probability of crashes rises.

However, even this solution is not completely satisfactory. Indeed, the system always suffers an overload that is not negligible. Particularly, when a unit becomes too old the corresponding heartbeat rate may get so high to be untenable.

An additional drawback of the solutions known in the art is that they can lead to wrong conclusions about the conditions of the different units. Particularly, each unit may be considered crashed even if it is working properly; for example, this happens when an agent running on the unit is unable to transmit the heartbeat signals as required (because it is blocked or temporarily busy), when a transport infrastructure of the heartbeat signals is unavailable (for example, because of a lack of connection between the unit and the central monitor), and the like.

SUMMARY OF THE INVENTION

The present invention proposes a solution, which is based on the idea of exploiting the normal flow of data for monitoring the availability of the system.

Particularly, an aspect of the present invention provides a method for monitoring availability of a data processing system. The system (including one or more local units and a central unit) is used for running an application, which involves repeated transmissions of blocks of data from the local units to the central unit. The method includes the following steps. First of all, a block of data to be transmitted to the central unit is provided. An expected transmission delay of a next block of data (with respect to the block of data) is determined. The block of data is then updated by attaching the indication of the expected transmission delay. The updated block of data can now be transmitted to the central unit. At this point, the indication of the expected transmission delay is extracted from the updated block of data. A failure of the local unit is then detected if the next block of data is not received within an expected receiving time (corresponding to the expected transmission delay).

The proposed solution has a negligible impact on the overhead of the system (since it leverages the same data flow that is already used by the application running on the system). As a result, the activity of monitoring the availability of the system does not adversely affect its performance.

At the same time, this approach provides an optimal verification rate for each local unit; indeed, the local unit is taken into consideration only when it is expected to transmit actual data. As a result, any failure of the local unit can be detected as soon as possible (without overburdening the system).

The preferred embodiments of the invention described in the following provide additional advantages.

For example, in an embodiment of the invention the expected transmission delay is set according to a known transmission period of the blocks of data.

This approach is very simple, and it can be applied whenever the application involves the periodic transmission of blocks of data.

Otherwise, the expected transmission delay is estimated using a predictive algorithm (based on the actual transmission time of one or more preceding blocks of data).

This solution is of general applicability; in any case, it ensures an acceptable degree of accuracy in many practical situations.

As a further enhancement, the expected receiving time is updated when approaching it (using a new expected transmission delay, which is estimated by the local computer in response to a corresponding request).

As a result, the expected receiving time is refreshed to compensate the intrinsic inaccuracy of the determination that was performed at the transmission time of the block of data (thereby avoiding the detection of any failure when the transmission of the next block of data is simply delayed).

A way to further improve the solution is to have the local unit estimate and send the new expected transmission delay of its own motion (when approaching a corresponding expected transmission time, which is based on an actual transmission time of the block of data and the expected transmission delay).

This feature avoids polling all the local units (thereby significantly reducing the information traffic in the system).

In a specific implementation, the expected receiving time of the next block of data is calculated according to an actual receiving time of the block of data and the corresponding expected transmission delay.

As a result, the expected receiving time takes into account the delay (assumed always the same for the sake of simplicity), which is required for the transmission of the blocks of data from the local units to the central unit.

In a preferred embodiment of the invention, an attempt to contact the local unit is performed when the next block of data is not received in due time; the local unit is then deemed in a crashing condition only if the result of the attempt is negative.

This additional feature avoids reaching wrong conclusions about the conditions of the local units (for example, considering unreachable a local unit working properly only because the central unit does not receive the next of block of data for whatever other reason).

A suggested choice for implementing this feature is that of attempting to connect on one or more communication ports of the local unit.

The proposed solution is very simple, but at the same time effective.

Advantageously, the expected receiving time is incremented when the result of the above-mentioned attempt is positive; the local unit is then deemed in a hanging condition after a predefined number of consecutive increments of the expected receiving time (without receiving the next block of data).

In this way, it is possible to determine when the application is unreachable (for example, because it is blocked or a transport infrastructure is unavailable), even if the local unit is working properly.

A further aspect of the present invention provides a computer program for performing the above-described method.

A still further aspect of the invention provides a program product embodying this computer program.

Moreover, another aspect of the invention provides a corresponding data processing system.

The characterizing features of the present invention are set forth in the appended claims. The invention itself, however, as well as further features and advantages thereof will be best understood by reference to the following detailed description, given purely by way of a nonrestrictive indication, to be read in conjunction with the accompanying drawings.

BRIEF DESCRIPTION OF THE DRAWINGS

FIGS. 3a-3b show a diagram describing the flow of activities relating to an illustrative implementation of the method.

DETAILED DESCRIPTION OF THE PREFERRED EMBODIMENT(S)

Figure 1A:
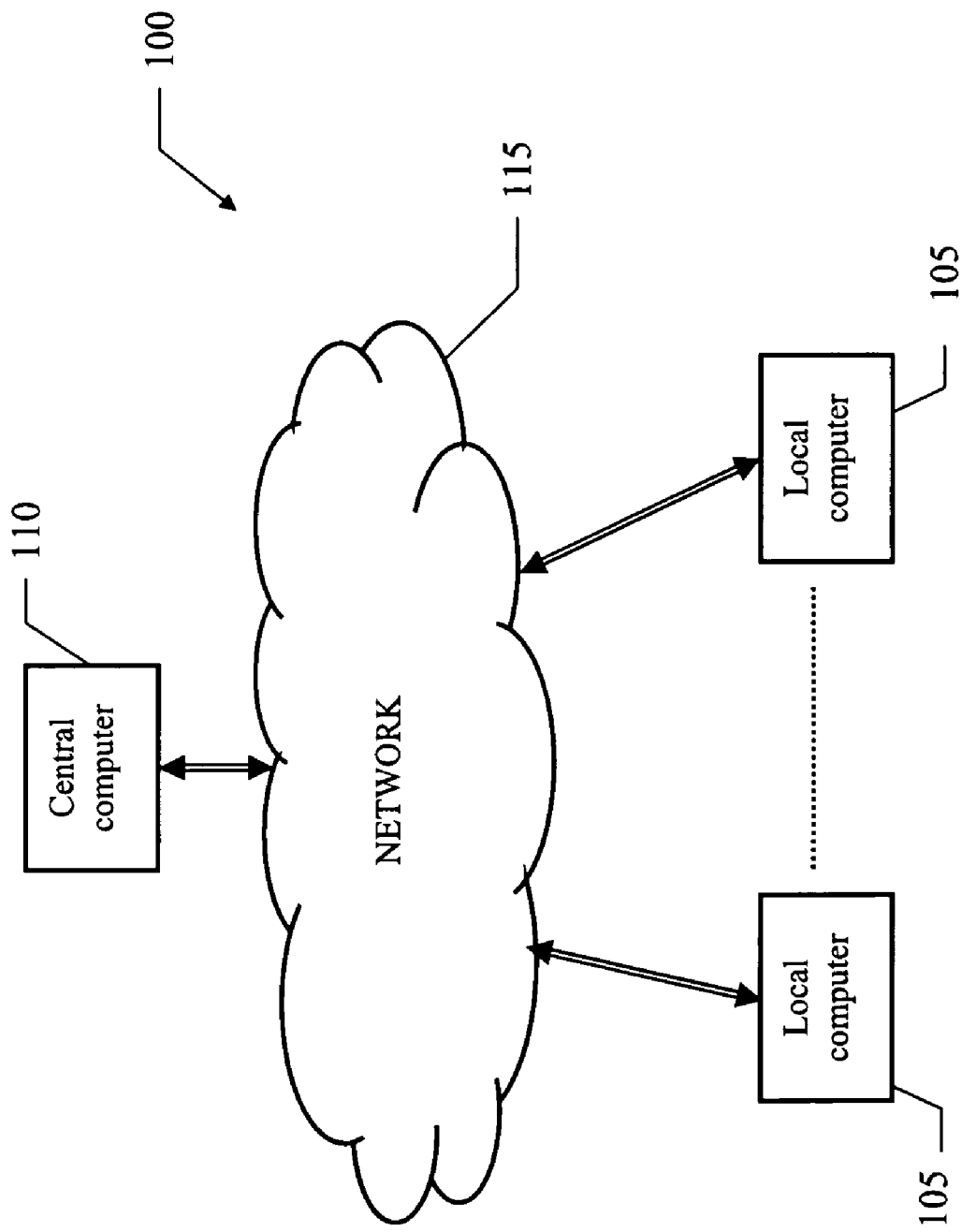
FIG. 1a is a schematic block diagram of a data processing system in which the method of the invention is applicable.

With reference in particular to FIG. 1a, a data processing system 100 with distributed architecture is illustrated. The system 100 implements an environment for managing several kinds of resources (consisting of any logical or physical entities).

Particularly, multiple local computers 105 directly control the resources under management; a central computer 110 is responsible to manage those resources of the system 100. The local computers 105 and the central computer 110 communicate through a network 115 (typically Internet-based). An example of management system based on an autonomic model is described in WO-A-2004017201; in this case, the local computers 105 self-adapt to a desired configuration defined by a set of rules, which are published by the central computer 110 into a shared repository.

Figure 1B:
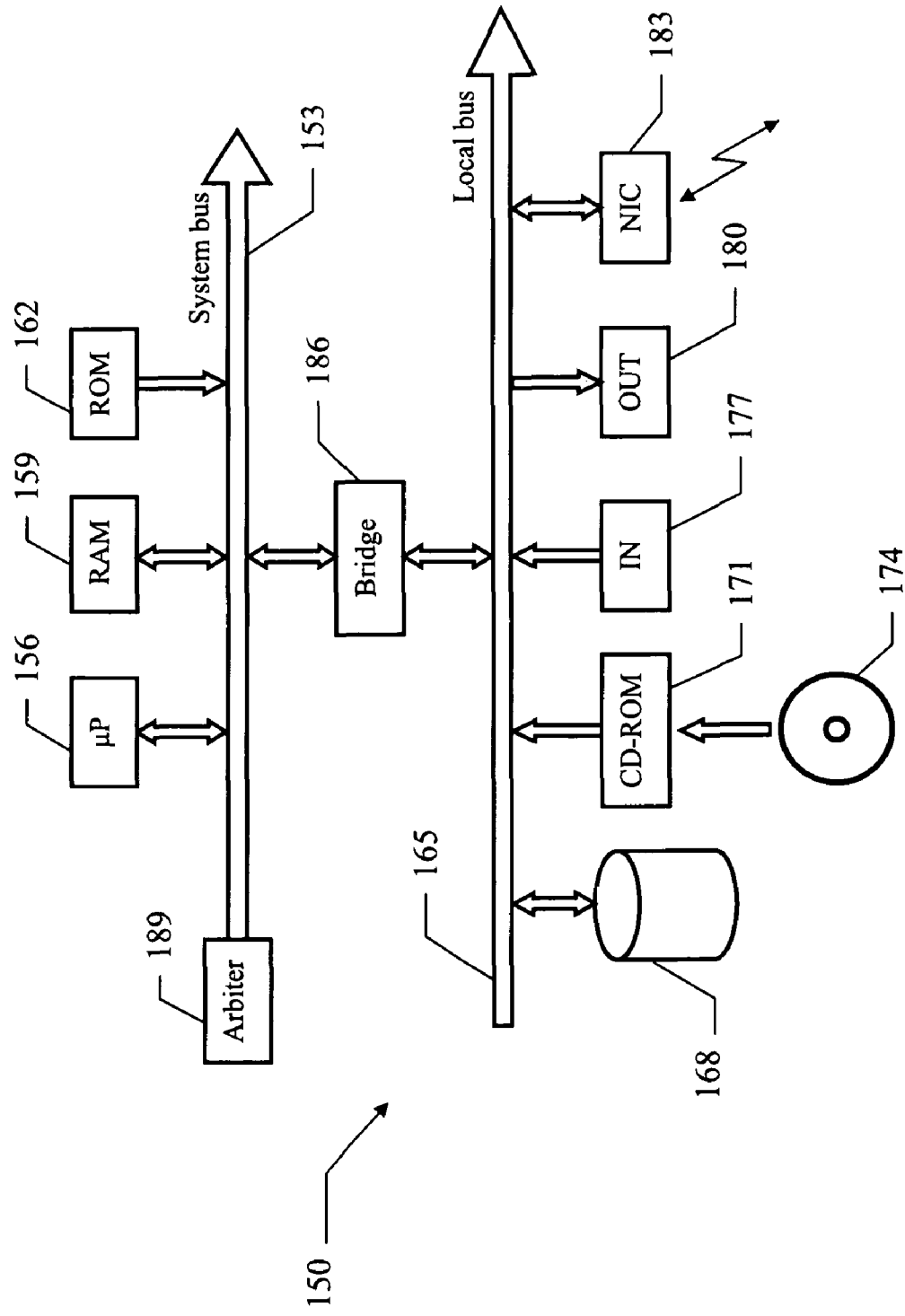
FIG. 1b shows the functional blocks of a generic computer of the system.

As shown in FIG. 1b, a generic computer of the system (local computer or central computer) is denoted with 150. The computer 150 is formed by several units that are connected in parallel to a system bus 153. In detail, one or more microprocessors ($\mu P$) 156 control operation of the computer 150; a RAM 159 is directly used as a working memory by the microprocessors 156, and a ROM 162 stores basic code for a bootstrap of the computer 150. Peripheral units are clustered around a local bus 165 (by means of respective interfaces). Particularly, a mass memory consists of a hard disk 168 and a drive 171 for reading CD-ROMs 174. Moreover, the computer 150 includes input devices 177 (for example, a keyboard and a mouse), and output devices 180 (for example, a monitor and a printer). A Network Interface Card (NIC) 183 is used to connect the computer 150 to the network. A bridge unit 186 interfaces the system bus 153 with the local bus 165. Each microprocessor 156 and the bridge unit 186 can operate as master agents requesting an access to the system bus 153 for transmitting information. An arbiter 189 manages the granting of the access with mutual exclusion to the system bus 153.

Figure 2:
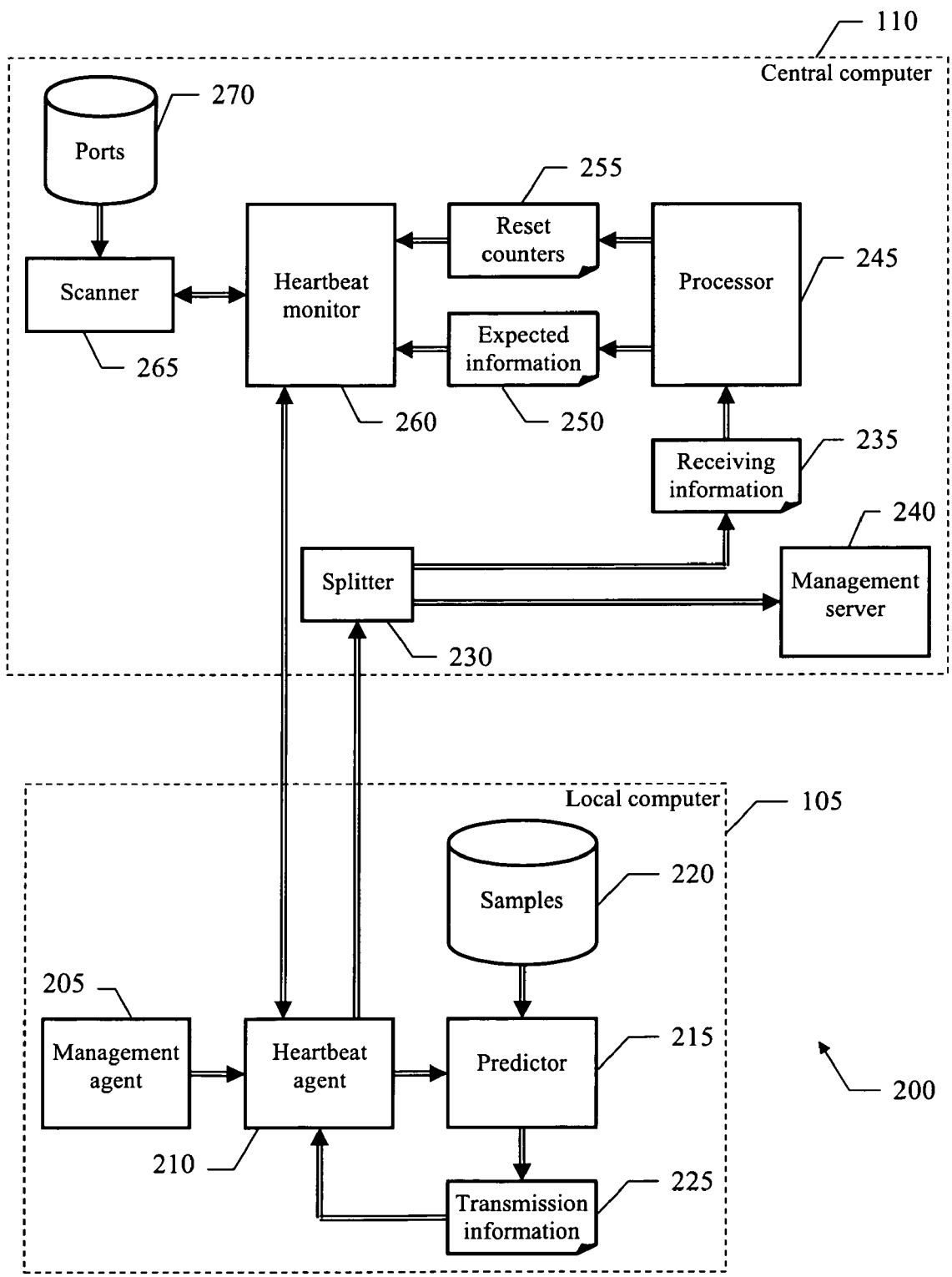
FIG. 2 depicts the main software components that can be used for practicing the method.

Moving now to FIG. 2, the main software components that can be used for practicing the invention are denoted as a whole with the reference 200. The information (programs and data) is typically stored on the hard disks and loaded (at least partially) into the corresponding working memories when the programs are running. The programs are initially installed onto the hard disks from CD-ROMs.

Considering in particular a generic local computer 105, a management agent 205 continually transmits blocks of data to the central computer 110; for example, in the autonomic management system described above the management agent 205 periodically uploads reports relating to the compliance of the local computer 105 with the corresponding rules.

The transmission of each block of data is intercepted by a heartbeat agent 210. The heartbeat agent 210 controls a predictor 215. The predictor 215 accesses a queue 220, which stores a set of samples indicating the actual transmission times of a predefined number of preceding blocks of data (for example, from 10 to 20). The predictor 215 estimates an expected transmission delay of a next block of data (with respect to the current one). For this purpose, an expected transmission time of the next block of data is obtained by applying a Linear Predictive Filter (LPF) to the samples extracted from the queue 220; the predictor 215 then calculates the expected transmission delay by subtracting the current time (approximating the actual transmission time of the block of data) from the expected transmission time. The predictor 215 also determines a transmission refresh time, which is used to trigger the calculation of a new expected transmission delay of the same next block of data; the transmission refresh time is obtained by subtracting a value equal to a predefined percentage of the expected transmission delay (for example, between 5% and 10%) from the expected transmission time. The transmission information so obtained (i.e., the expected transmission delay and the transmission refresh time) is saved into a corresponding table 225, which is accessed by the heartbeat agent 210.

The heartbeat agent 210 updates the block of data by attaching the expected transmission delay. For example, the expected transmission delay can be inserted as a comment into a header of the block of data (in a field identified by a corresponding tag). The (updated) block of data is then transmitted to the central computer 110. The actual transmission time of the block of data is also saved into the queue 220 (removing the oldest value).

The above-described structure can be simplified when the management agent 205 transmits the blocks of data to the central computer 110 periodically. In this case, the expected transmission delay is set to the transmission period of the blocks of data (with the expected transmission time that is calculated simply adding the period to the actual transmission time of the current block of data).

Moving now to the central computer 110, the block of data is received by a splitter 230. The splitter 230 detects the actual receiving time of the block of data; moreover, it extracts the expected transmission delay of the next block of data. The receiving information so obtained for each local computer (i.e., the actual receiving time and the expected transmission delay) is saved into a corresponding entry of an array 235. At the same time, the splitter 230 forwards the block of data to a management server 240 for its processing. It should be noted that the field including the expected transmission delay is automatically disregarded by the management server 240; therefore, its presence is completely opaque to the management server 240.

The array 235 is accessed by a processor 245, which calculates an expected receiving time of the next block of data (for each local computer). For this purpose, the processor 245 increases the expected transmission delay by a predefined percentage (for example, between 5% and 10%); the increased expected transmission delay is then added to the actual receiving time of the current block of data. In this way, a tolerance margin (for compensating the possible inaccuracy of the determination of the expected transmission delay) is provided. The processor 245 also determines a receiving refresh time, which is used to trigger the request of a new expected transmission delay (of the next block of data) to the corresponding local computer, in order to recalculate its expected receiving time; the receiving refresh time is simply obtained by adding the (original) expected transmission delay to the actual receiving time of the current block of data. The expected receiving time and the receiving refresh time for each local computer are saved into a corresponding entry of an array 250. The processor 245 also controls a further array 255; for each local computer, the array 255 stores a counter denoting the consecutive number of times for which the corresponding expected receiving time (in the array 250) has been reset without receiving the respective block of data.

Figure 3A:
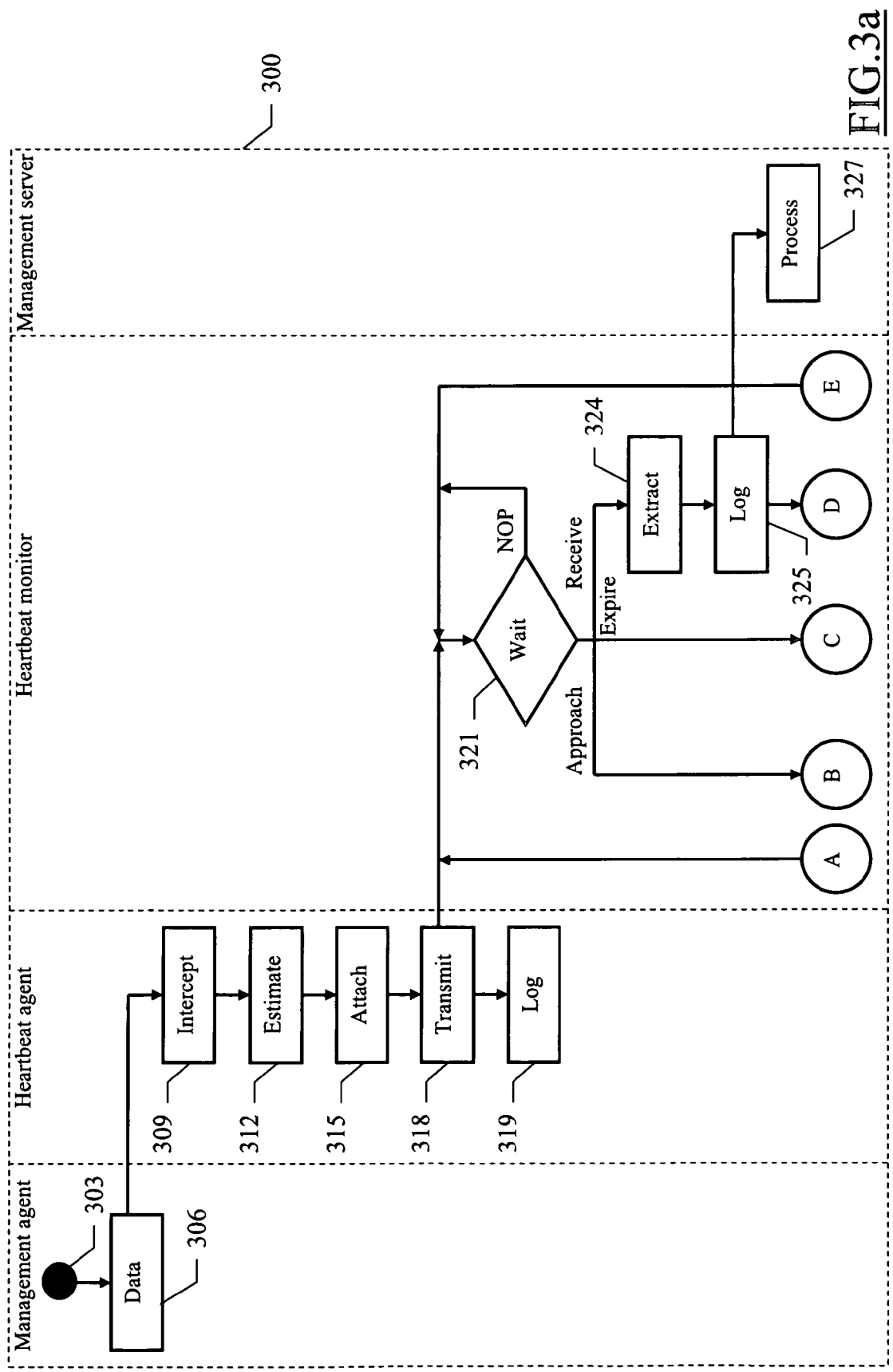

The arrays 250 and 255 are accessed by a heartbeat monitor 260 (which also interfaces with the heartbeat agent 210 of every local computer directly). The heartbeat monitor 260 further controls a scanner 265; the scanner 265 is used to verify the availability of a predefined subset of communication ports of each local computer. As it is well known, each port consists of a number that identifies a logical communication channel (so as to distinguish among multiple channels available on the same computer). In the Internet, the ports range from 0 to 65536. The ports 1-1024 (called well-known ports) are reserved by certain privileged services. The ports 1025-49151 (called registered ports) are pre-assigned to specific applications for use by every service. The remaining ports 49152-65536 (called dynamic ports) can be assigned to every service at will. The subset of ports to be verified by the scanner 265 is stored in a table 270. Preferably, the subset of ports includes a predefined number (for example, between 10 and 20) of the well-known ports; an example of this subset of ports is:

20 FTP Data
21 FTP Control
23 telnet
25 SMTP
53 DNS
70 gopher
79 finger
80 HTTP (web)
88 Kerberos
110 POP3
113 AUTH
119 News
139 NETBIOS Considering now FIGS. 3a-3b, the logic flow of a monitoring process according to an embodiment of the invention is represented with a method 300. The method begins at the black start circle 303 in the swim-lane of the management agent of a generic local computer. A new block of data to be transmitted to the central computer is then provided at block 306.

The transmission of the block of data is intercepted by the corresponding heartbeat agent at block 309 (for example, using a hooking technique). The method then passes to block 312, wherein the expected transmission delay of the next block of data is estimated (either applying the Linear Predictive Filter to the available samples or simply exploiting the known transmission period); at the same time, the corresponding transmission refresh time is calculated. The block of data is now updated by attaching the expected transmission delay so obtained (block 315). The (updated) block of data is then transmitted to the central computer at block 318. At the same time, the actual transmission time of the block of data is also saved into the corresponding queue at block 319.

In the meanwhile, the heartbeat monitor of the central computer is waiting in an idle loop at block 321. As soon as a new block of data is received from a generic local computer, the flow of activity passes to block 324; at this point, the actual receiving time of the block of data is detected and the expected transmission delay (of the next block of data) is extracted. The information so obtained is saved into the corresponding array at block 325. The block of data is then forwarded to the management server for its processing at block 327. With reference now to block 330, the expected receiving time of the next block of data is calculated (increasing the expected transmission delay, and then adding the value so obtained to the actual receiving time of the current block of data). Descending into block 332, the corresponding reset counter is zeroed. The method then returns to block 321 waiting for a new event.

Considering again block 321, the heartbeat monitor can be configured to refresh the expected receiving times of the local computers automatically. In this case, when the current time reaches the receiving refresh time of a generic local computer (i.e., it is approaching its expected receiving time) a refresh request is transmitted to the corresponding heartbeat agent at block 333. In response thereto, the heartbeat agent at block 336 estimates a new expected transmission delay (with the transmission refresh time that is updated accordingly). This value is based on the actual status of the corresponding management agent (for example, taking into account any slowdown of its operation). In addition or in alternative, the heartbeat agent can be configured to refresh the expected transmission delay of its own motion. In this case, the same block is entered when the current time reaches the transmission refresh time (i.e., it is approaching the expected transmission time). In any case, the method then passes to block 339, wherein the new expected transmission delay is sent to the heartbeat monitor on the central computer.

The heartbeat monitor is waiting at block 342 for a response to the refreshing request (when applicable). As soon as the new expected transmission delay is received, the flow of activity passes to block 345. In this phase, the expected receiving time of the next block of data is updated accordingly (recalculating it by applying the above-described formula with the new expected transmission delay). Conversely, if the heartbeat monitor does not receive the new expected transmission delay within an acceptable time frame (from the sending of the refresh request), the flow of activity descends from block 342 to block 348 (described in the following); the time frame is equal to a predefined percentage of the corresponding expected transmission delay (for example, between 5% and 10%).

Referring back to block 321, when the expected receiving time of a generic local computer expires the method proceeds to block 348; in this phase, the subset of ports to be scanned is retrieved from the corresponding table. A loop is then performed for each port (starting from the first one); the loop begins at block 351 wherein a current port is verified; for this purpose, the central computer attempts to open a connection with the local computer on that port.

If the operation succeeds (decision block 354) the method continues to block 357; as a result, the corresponding reset counter is incremented by one. A test is now made at block 360 to determine whether the reset counter reaches a predefined threshold value (for example, between 2 and 5). If not, the expected receiving time is reset at block 365 by adding the corresponding expected transmission delay (with the local computer that is still deemed alive). Conversely, a hanging condition of the management agent on the local computer is detected at block 366 (since no block of data is received irrespective of the fact that the local computer is working properly); a corresponding error message is then provided to an operator (for example, requiring a remote intervention on the local computer for reloading the management agent). In both cases, the method then returns to the waiting block 321.

Referring back to block 354, if the attempt to open the connection on the port fails the flow of activity passes to decision block 369. If the last port of the subset has not been processed yet, the flow of activity returns to block 351 for repeating the same operations on a next port. Conversely, when the verification of all the ports has failed a crashing condition of the local computer is detected at block 372; a corresponding error message is then provided to the operator (for example, requiring a manual intervention on the local computer for its reboot). The method again returns to the waiting block 321.

Naturally, in order to satisfy local and specific requirements, a person skilled in the art may apply to the solution described above many modifications and alterations. Particularly, although the present invention has been described with a certain degree of particularity with reference to preferred embodiment(s) thereof, it should be understood that various omissions, substitutions and changes in the form and details as well as other embodiments are possible; moreover, it is expressly intended that specific elements and/or method steps described in connection with any disclosed embodiment of the invention may be incorporated in any other embodiment as a general matter of design choice.

For example, the same principles are also applicable to any other application involving the repeated transmission of generic blocks of data (for example, a monitoring application wherein metering data is periodically uploaded to the central computer).

Similar considerations apply if the blocks of data are updated in a different way; for example, the expected transmission delay may be added by a proxy (between the local computer and the central computer), or the information may be inserted into a further field being added to the block of data (which field is removed before passing the block of data to the management server). Moreover, it is possible to transmit other information indicative of the delay of the next block of data (for example, its expected transmission time); alternatively, the central computer detects the failure of the local computer when the next block of data is not received within a different expected receiving time (for example, calculated without any tolerance margin by simply using the original expected transmission delay), or this operation is performed by another computer.

Likewise, when the application involves the periodic transmission of blocks of data the expected transmission delay can be set in any other way according to the corresponding period (for example, incrementing it by a predefined percentage).

On the other hand, the use of different predictive algorithms (based on the actual transmission time of one or more preceding blocks of data) is contemplated (for example, using filters of higher order or of the Kalman type).

Similar considerations apply if the refresh of the expected transmission delay is triggered in a different way (in any case, in response to the approaching of the expected receiving time on the central computer and/or of the expected transmission time on the local computer).

Moreover, the central computer can calculate the expected receiving time with a different formula (based on the actual receiving time of the current block of data and the expected transmission delay of the next one).

Without departing from the principles of the invention, the central unit can scan other ports of the local unit (for example, one or more dynamic ports that are used by known applications); in any case, a vanilla scan of all the ports is not excluded.

The proposed solution is also suitable to be implemented incrementing the expected receiving time by a different value when the central computer succeeds in contacting the local computer (for example, by a predefined percentage of the expected transmission delay).

In any case, the programs and the corresponding data can be structured in a different way, or additional modules or functions can be provided; moreover, the proposed solution can implement an equivalent method (for example, with similar or additional steps).

Likewise, it is also possible to distribute the programs in any other computer readable medium (such as a DVD).

Similar considerations apply if the system has a different architecture or is based on equivalent units; moreover, each computer can have another structure or it can be replaced with any data processing entity (such as a PDA, a mobile phone, and the like).

In any case, even though in the preceding description reference has been made to a distributed data processing system, this is not to be intended as a limitation; indeed, the invention can also be applied to monitor the availability of the components of a computer (for example, wherein peripheral units repeatedly transmit blocks of data to a central processor).

Moreover, it will be apparent to those skilled in the art that the additional features providing further advantages are not essential for carrying out the invention, and may be omitted or replaced with different features.

For example, the use of the proposed solution only when the application involves the periodic transmission of blocks of data is not excluded.

Conversely, it is possible to apply the predictive algorithm to estimate the expected transmission delay of the next blocks of data in any case.

An implementation of the proposed solution with the refresh of the expected receiving time that is controlled only by the central computer or only by the local computers is within the scope of the invention. In any case, there is nothing to prevent an implementation of the invention without any refreshing procedure.

It is also possible to determine the expected receiving time of the next block of data in a different way (for example, simply setting it to a value that is provided by the local computer together with the current block of data).

Moreover, the reference to the scan of the ports must not to be interpreted in a limitative manner; indeed, in different embodiments of the invention it is also possible to verify the local unit attempting to connect with it in a different way (for example, requesting a specific service).

Likewise, other actions can be taken when the above-mentioned attempt succeeds (for example, always considering the local computer alive without using any reset counter, or providing a warning to the operator informing that the local computer is a candidate for failing).

In any case, an implementation of the present invention without any port scan (or more generally any attempt to connect with the local unit) when the next block of data is not received in due time is contemplated.

Vice-versa, it should be noted that this additional feature is suitable to be used (alone or in combination with the other features of the invention) even in a standard method of monitoring the availability of the system (i.e., based on the heartbeat signals).

Alternatively, the programs are pre-loaded onto the hard disks, are sent to the computers through the network, are broadcast, or more generally are provided in any other form directly loadable into the working memories of the computers.

However, the method according to the present invention leads itself to be carried out with a hardware structure (for example, integrated in chips of semiconductor material), or with a combination of software and hardware.

The invention claimed is:

1. A method for monitoring availability of a data processing system, including at least one local unit and a central unit, for running an application involving repeated transmissions of blocks of data from the at least one local unit to the central unit, wherein for each local unit the method includes the steps of:
   providing a block of data to be transmitted to the central unit;
   determining expected transmission delay of a next block of data with respect to the block of data;
   updating the block of data by attaching an indication of the expected transmission delay;
   transmitting the updated block of data to the central unit, the updated block of data providing the indication of the expected transmission delay such that not receiving the next block of data within an expected receiving time corresponding to the expected transmission delay causes a detection of a failure of the local unit;
   receiving a refresh request to the local unit in response to an approaching of the expected receiving time;
   determining an indication of a new expected transmission delay of the next block of data in response to the refresh request; and
   transmitting the indication of the new expected transmission delay from the local unit to the central unit, the new expected transmission delay providing a basis for an update for the expected receiving time.

2. The method according to claim 1, further including the steps of:
   determining an indication of a new expected transmission delay of the next block of data in response to an approaching of a corresponding expected transmission time based on an actual transmission time of the block of data and the expected transmission delay; and
   transmitting the indication of the new expected transmission delay from the local unit to the central unit, the new expected transmission delay providing an update for the expected receiving time.

3. The method according to claim 1, wherein the step of detection of the failure of the local unit includes:
   incrementing the expected receiving time of the next block of data in response to a positive result of the attempt to connect; and
   determining a hanging condition of the application on the local unit in response to a predefined number of consecutive increments of the expected receiving time without receiving the next block of data.

4. A computer usable program product comprising a computer usable storage device including computer usable code for monitoring availability of a data processing system, including at least one local unit and a central unit, for running an application involving repeated transmissions of blocks of data from the at least one local unit to the central unit, wherein for each local unit the computer usable code comprising:
   computer usable code for providing a block of data to be transmitted to the central unit;
   computer usable code for determining expected transmission delay of a next block of data with respect to the block of data;
   computer usable code for updating the block of data by attaching the indication of the expected transmission delay;
   computer usable code for transmitting the updated block of data to the central unit;
   computer usable code for extracting the indication of the expected transmission delay from the updated block of data;
   computer usable code for detecting a failure of the local unit if the next block of data is not received within an expected receiving time corresponding to the expected transmission delay;
   computer usable code for sending a refresh request to the local unit in response to an approaching of the expected receiving time;
   computer usable code for the local unit determining an indication of a new expected transmission delay of the next block of data in response to the refresh request;
   computer usable code for transmitting the indication of the new expected transmission delay from the local unit to the central unit; and
   computer usable code for updating the expected receiving time according to the new expected transmission delay.

5. The computer usable program product according to claim 4, further including:

computer usable code for the local unit determining an indication of a new expected transmission delay of the next block of data in response to an approaching of a corresponding expected transmission time based on an actual transmission time of the block of data and the expected transmission delay;

computer usable code for transmitting the indication of the new expected transmission delay from the local unit to the central unit; and computer usable code for updating the expected receiving time according to the new expected transmission delay.

6. The computer usable program product according to claim 4, wherein the computer usable code for detecting the failure of the local unit further includes:

computer usable code for incrementing the expected receiving time of the next block of data in response to a positive result of the attempt to connect; and computer usable code for determining a hanging condition of the application on the local unit in response to a predefined number of consecutive increments of the expected receiving time without receiving the next block of data.

7. A data processing system for monitoring availability of a data processing system, including at least one local unit and a central unit, for running an application involving repeated transmissions of blocks of data from the at least one local unit to the central unit, the data processing system comprising:

a storage device including a storage medium, wherein the storage device stores computer usable program code; and a processor, wherein the processor executes the computer usable program code, and wherein for each local unit the computer usable program code comprises:

computer usable code for providing a block of data to be transmitted to the central unit;

computer usable code for determining expected transmission delay of a next block of data with respect to the block of data;

computer usable code for updating the block of data by attaching the indication of the expected transmission delay;

computer usable code for transmitting the updated block of data to the central unit;

computer usable code for extracting the indication of the expected transmission delay from the updated block of data;

computer usable code for detecting a failure of the local unit if the next block of data is not received within an expected receiving time corresponding to the expected transmission delay;

computer usable code for sending a refresh request to the local unit in response to an approaching of the expected receiving time;

computer usable code for the local unit determining an indication of a new expected transmission delay of the next block of data in response to the refresh request;

computer usable code for transmitting the indication of the new expected transmission delay from the local unit to the central unit; and computer usable code for updating the expected receiving time according to the new expected transmission delay.

8. The data processing system according to claim 7, further including:

computer usable code for the local unit determining an indication of a new expected transmission delay of the next block of data in response to an approaching of a corresponding expected transmission time based on an actual transmission time of the block of data and the expected transmission delay;

computer usable code for transmitting the indication of the new expected transmission delay from the local unit to the central unit; and computer usable code for updating the expected receiving time according to the new expected transmission delay.

9. The data processing system according to claim 7, wherein the computer usable code for detecting the failure of the local unit further includes:

computer usable code for incrementing the expected receiving time of the next block of data in response to a positive result of the attempt to connect; and computer usable code for determining a hanging condition of the application on the local unit in response to a predefined number of consecutive increments of the expected receiving time without receiving the next block of data.

* * * * *